July 23, 1957

R. C. PERRY ET AL 2,799,978

PLATE GLASS POLISHING APPARATUS

Filed April 2, 1956

INVENTORS
ROBERT C. PERRY and
FRED W. KOCHER
BY
Oscar L. Spencer
ATTORNEY

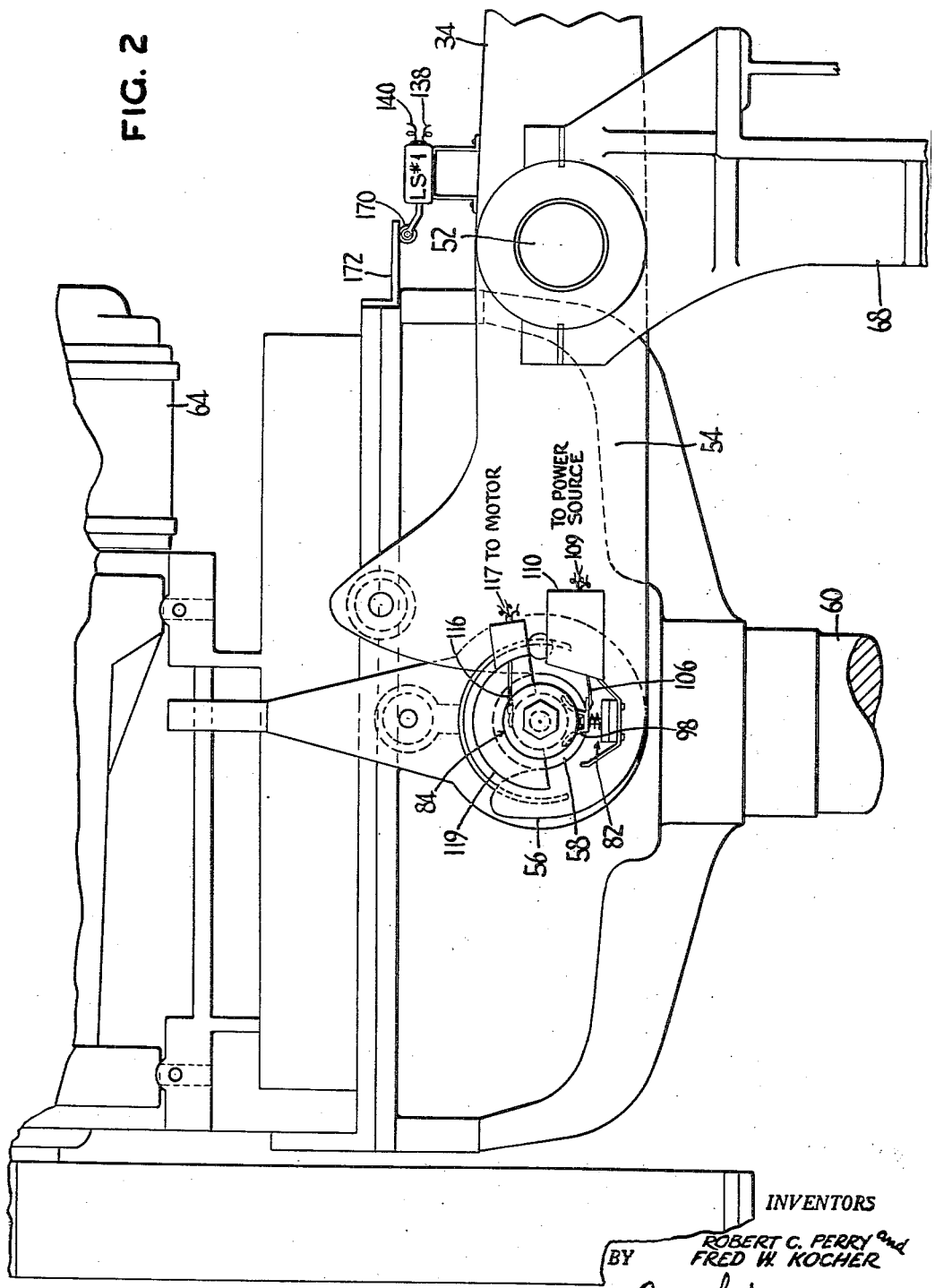

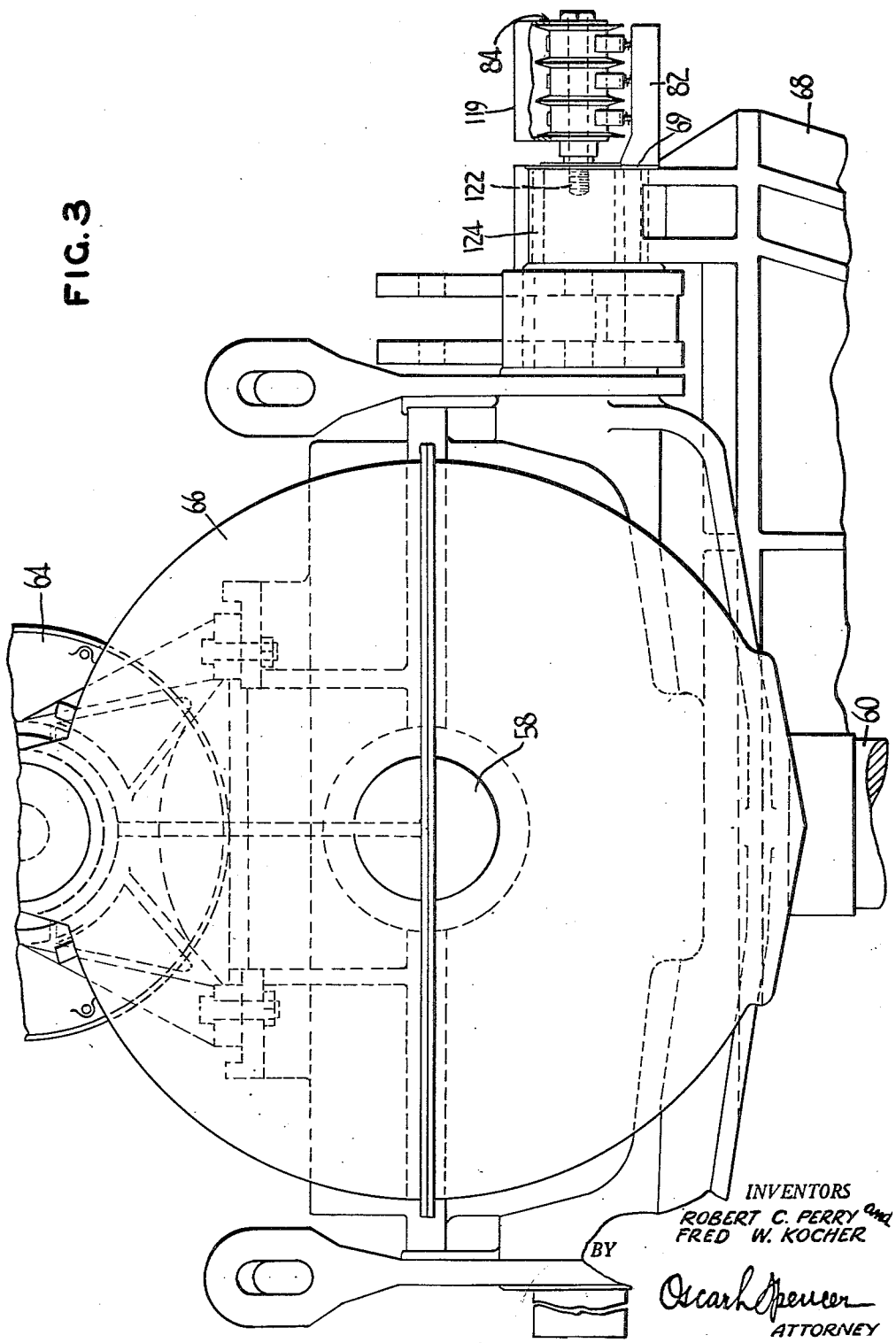

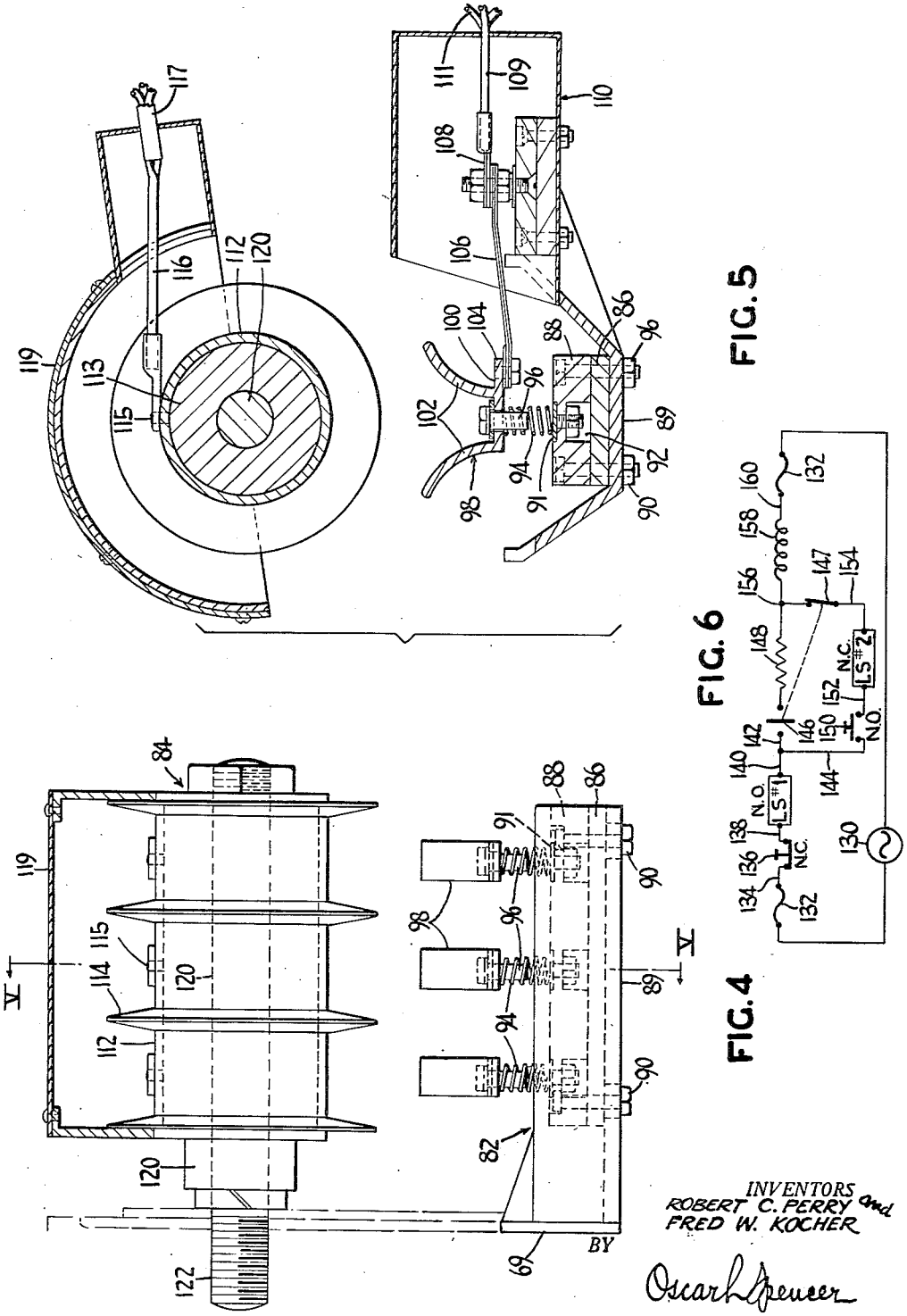

United States Patent Office 2,799,978
Patented July 23, 1957

2,799,978

PLATE GLASS POLISHING APPARATUS

Robert C. Perry, Crystal City, and Fred W. Kocher, Festus, Mo., assignors to Pittsburgh Plate Glass Company, Allegheny County, Pa., a corporation of Pennsylvania Application April 2, 1956, Serial No. 575,492

11 Claims. (Cl. 51—110)

This application relates to improvement in plate glass polishing apparatus. Specifically, this invention relates to a novel electrical control system used with a plate glass polishing line.

Before the present invention, it was necessary for an operator to climb to a precarious position and expose himself to high voltages in order to disconnect manually a drive motor which causes the polishers to rotate, whenever the polishing spindle and runners had to be removed for maintenance. Also, it was necessary for the operator to expose himself to the high voltages and to climb to the dangerous position while connecting the motor to the power source upon replacing a spindle and its runners in the line.

The present invention avoids the necessity for manual connection and disconnection of the motor from its power source and its attendant danger by utilizing a circuit containing a novel electrical switch provided with one switch element fixed for vertical motion with a spindle drive motor and having electrical contacts attached electrically to the drive motor. The novel switch includes another switch element supported on a resilient support fixed to the support housing relative to which the polishing spindle moves vertically. The latter switch element includes contacts connected to a potential source through an appropriate safety control circuit including special limit switches. The contacts of the other switch element are spring urged away from the glass to make intimate electrical contact with the contacts of the first switch element before the polisher comes into contact with the glass. By virtue of such electrical circuitry, the drive motor circuit is brought into contact with the power circuit while the runners are spaced from the glass, thus enabling the drive motor to rotate the spindle and its supported polisher runners before the polishers contact the glass.

Another feature of the invention is the incorporation of another safety limit switch in the feed lines from the power source to the novel electrical switch. This other safety limit switch is maintained in the open position until the novel switch elements are in intimate electrical contact, thus preventing arcing in the vicinity of operating personnel.

Starting the rotation of the runners before making contact with the glass is necessitated by the tremendous static frictional force which, added to the inertia present because of the great mass of the polishing mechanism, presents a tremendous load on the starter for the motor. A smaller load is created by starting the polisher rotation out of frictional contact with the glass. Furthermore, the inertia of the rotating polisher as it comes into contact with the glass lessens the force required to overcome the initial drag between the polisher and the glass. When a polisher driven by a relatively small drive motor, sufficient to start rotating the polisher in air but insufficient to start rotating the polisher while in contact with the glass, is brought into engagement with the glass before its rotation has started, the motor is liable to burn out because of its overload. The present invention comprises a control circuit including a limit switch that automatically inactivates the starting circuit whenever the polisher runner engages the glass.

The features of this invention will be understood more fully upon studying the following description of a particular embodiment, taken together with the accompanying drawings which form a part thereof. In the drawings, Figure 1 is an elevational view partly in section of a typical glass polishing apparatus, showing certain elements of the present improvement schematically.

Figure 2 is an enlarged elevational view of Figure 1 showing a portion of the apparatus provided with a switch according to the present invention in its closed position, and with certain structural elements removed to show certain other details clearly.

Figure 3 is an enlarged elevation at right angles to Figure 2.

Figure 4 is a detailed elevation partly in section of a switch according to the present invention in its open position.

Figure 5 is a section along the lines V—V of Figure 4.

Figure 6 is a schematic electrical diagram of a portion of the electrical circuitry used.

Polisher apparatus structure

Figure 1:
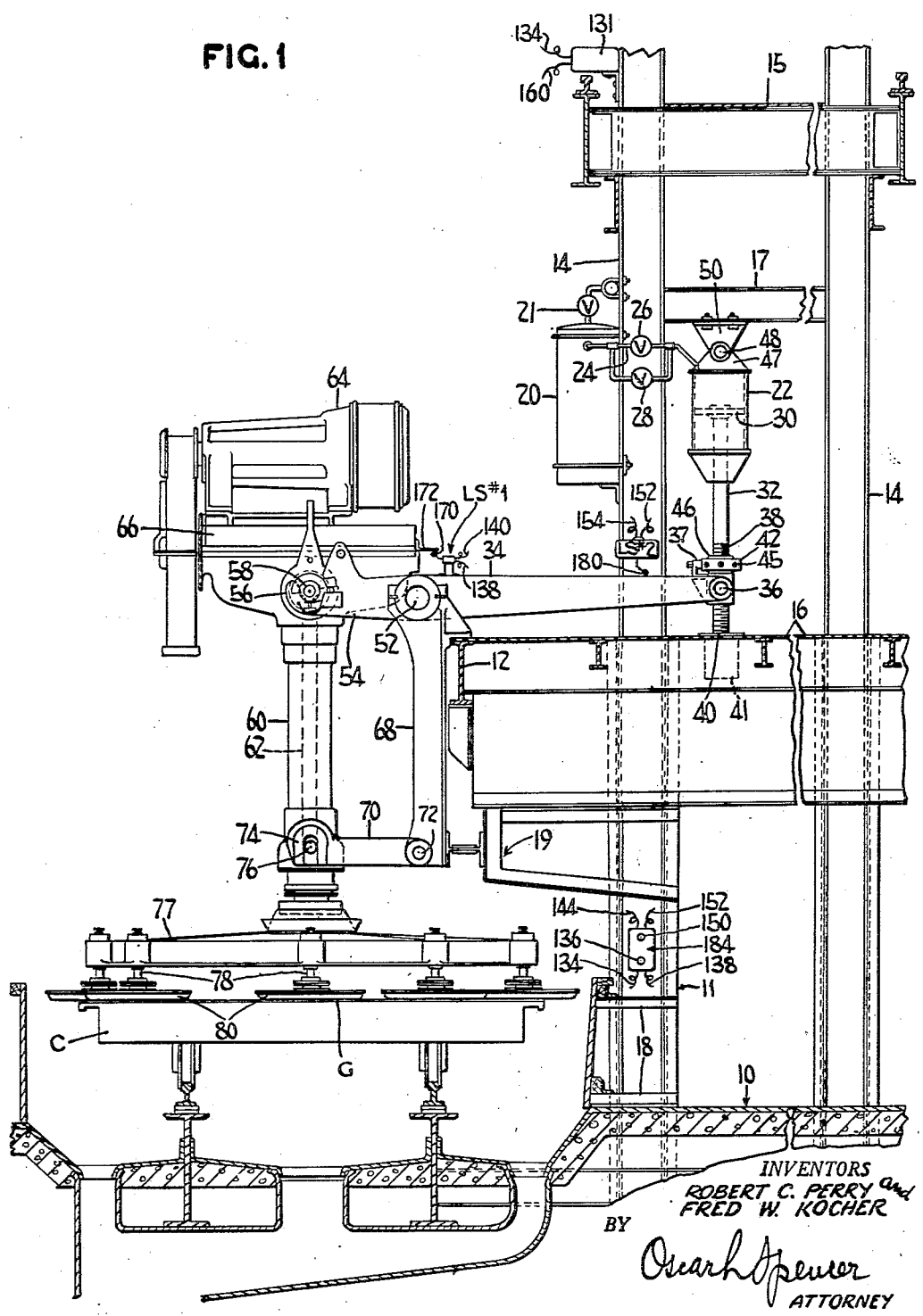

Referring to the drawings, reference number 10 refers to the floor of a building which is used to support the framework 11 of polishing apparatus, which extends longitudinally of the polishing line along I-beams 12. The framework 11 includes pillars 14 interconnected by upper cross beams 15, bottom cross beams 16 and intermediate cross beams 17. Additional bracing members 18 and 19 are provided for reinforcement and support.

At each polishing station along the line, a pillar 14 carries a pressure tank 20, wherein air pressure is maintained at 80 pounds per square inch pressure as monitored by a check valve 21 in the pressure tank supply line. This pressure tank communicates with a piston cylinder 22 by means of a fluid supply pipe 24 having a control valve 26 and a valved by-pass 28. A piston 30 is located within the piston cylinder 22 and is displaceable vertically therein. Piston 30 includes a piston rod 32 connected to a lever arm 34 by means of a pivot connection 36 carried by a bearing housing 37. The bottom portion of the piston rod 32 is externally threaded at 38. The bottom 40 of the piston rod 32 is free to move within a piston guard 41 attached below and surrounding an aperture in bottom cross beam 16.

A collar 42 forms part of the bearing housing 37 surrounding the threaded portion 38 of piston 32. Set screws 45 extend through the collar 42 to help lock bearing housing 37 in a proper vertical position along piston rod 32. A stop nut 46 is internally threaded to bear against the upper surface of the collar 42 to fix the position of the pivot connection 36 and the extremity of the lever arm 34 attached thereto relative to the position of the piston 30 within the piston cylinder 22. The upper end of piston cylinder 22 contains a bracket 47 attached at 48 to a depending bracket 50 fixed at its upper extremity to the intermediate cross beam 17.

Lever arm 34 extends from pivot connection 36 to a pivot bearing 52, and beyond the pivot bearing to form a small bifurcated lever arm 54 having a hooked end 56. The hooks engage the bottom of trunnions 58 carried by the support for the polisher. A cross arm 69 is attached to lever arm 54.

The polisher comprises a tubular support 60 containing upper and lower bearings at its upper and lower end. A runner shaft 62 is journaled in the upper and lower bearings. A drive motor 64 drives runner shaft 62 through gearing contained in a gear housing 66.

Pivot bearing 52 is carried by the upper end of a support bracket 68, which is connected to longitudinal I-beam 12 and bracing member 19 to form part of the support structure 11. At the bottom of support bracket 68, a link 70 is pivoted through a lower pivot bearing 72. The free end of link 70 is provided with hook shaped ends 74 which engage lower trunnions 76 carried by the lower extremity of the tubular support 60.

Runner shaft 62 is rigidly connected to a spider 77, which carries freely rotatable shafts 78 journaled through the radial spider arms. Felt faced runners 80 are fixed to the extremity of shafts 78. Runners 80 rub against the surface of a glass sheet G carried by cars C conveyed past a series of aligned polishers forming the polishing line.

Electrical switch structure

The novel switch forming an important feature of the present invention comprises a fixed switch contact element 82 mounted on bracket cross arm 69, and a movable switch contact element 84 mounted in fixed relation to the upper trunnions 58 which are fixed to gear housing 66.

Figures 4 and 5 show how the switch contact elements 82 and 84 are constructed. Switch contact elements 82 comprise a Formica insulator 86 and a mounting block of Formica 88. Both these Formica elements 86 and 88 are threaded to receive externally threaded bolts 90 which secure the elements 82 to a bucket-shaped bracket 89 (Fig. 4). One end of this structure is fixed to cross arm 69.

A slug 91 threadedly engages a threaded socket 92 within the mounting block 88. A spring 94 is welded to the top surface of slug 91. The upper end of the spring surrounds a steel post 96 extending through the bottom of a contact finger 98 of copper or silver. This contact finger includes a base 100 and arms 102 extending upwardly and outwardly to form upper arcuate surfaces. The base 100 extends at one end into an extension 104 connected to a flexible copper conduit 106 which leads to an electrode 108 within a junction box 110 welded to bracket 89. Three contact fingers 98 are shown. Each is adapted to contact a different electrode within the junction box. The electrodes within the junction box are connected to different phases of a polyphase power source. Wires 109 are connected to the electrodes 108 to form cable 111.

The other switch contact element 84 comprises cylindrical copper contact rings 112 mounted on a Formica bushing 113 and separated by Formica insulators 114. Electrodes 115 are mounted atop each contact ring in electrical contact therewith. A wire 116 extends from each electrode to form a cable 117. Each wire in the cable is coupled to a different terminal for the drive motor 64. The cylindrical copper contact rings are located in axial alignment within a steel cover 119. The contactor fingers 98 and contact rings 112 are so spaced axially that all three rings and fingers make simultaneous contact. The bushing 113 is supported by an axial support rod 120 which is externally threaded at its end 122 to insure its attachment to an internally threaded recess in an extension 124 provided on the gear housing 66.

The steel posts 96 are secured to the bases 100 by screws extending through apertures provided therein. The steel posts 96 extend beyond the bottom of the base 100 approximately one-half the expanded distance of the springs 94, thus providing approximately ½ inch for displacement of each contact finger 98 after it has been contacted by its corresponding copper contact rings 112. The contact fingers are urged against the contact rings during further displacement of the polisher relative to the glass, thereby providing an intimate contact and keeping the circuit to the drive motor closed, thus rotating the polisher before the latter contacts the glass.

Safety circuitry

Referring especially to Figures 1, 2 and 6, the construction and operation of the safety circuits will be described. The circuitry includes a potential source 130 and fuses 132 coupled to said source. A lead 134 couples the source of potential to one side of a stop button switch 136. Another lead 138 connects the other terminal of stop button switch 136 to limit switch LS1. The latter in turn is coupled at its other end to a lead 140. The latter lead has two branches 142 and 144. Branch 142 contains a starter coil contact 146 and a resistance 148 in series. Branch 144 is coupled to one terminal of a start button switch 150 and includes a lead 152 coupled to one terminal of a limit switch LS2 and another lead 154 coupling the other terminal of the limit switch LS2 to another starter coil contact 147 which is ganged mechanically with contact 146 so that when one contact in one branch is open, the other contact is closed and vice versa. The branches are connected together at terminal 156 which is connected to one terminal of the motor starting coil 158. Another lead 160 connects the other end of the motor starting coil 158 with the source of potential at a junction box 131. The latter carries the fuses 132 and a bus bar from source 130.

Limit switch LS1 is mounted on a lever arm 34 and includes a roller 170 adapted to make contact with the under surface of a flange 172 carried by the gear housing 66. LS1 is normally open except when the polisher apparatus is moved vertically so that flange 172 engages roller 170, thus closing limit switch LS1. The relation of LS1 to roller contact 170 and flange 172 is such that flange 172 does not cause LS1 to be closed until after switch contact elements 82 and 84 are in intimate electrical contact. This provision eliminates arcing between the contact elements when current is supplied to the driving motor 64.

Limit switch LS2 is fixed to vertical pillar 14. It includes a roller 180 extending downwardly therefrom toward the upper edge surface of lever arm 34. LS2 is normally closed except when lever arm 34 rotates upwardly in response to the downward movement of the polisher spindle 60 and its appurtenant polishing apparatus. Limit switch LS2 is so adjusted that when the polisher runners 80 contact the glass sheet G, roller 180 is engaged by the upper edge surface of lever arm 34 to open LS2.

Stop button switch 136 and start button switch 150 are located in a housing 184. The latter is located in a position convenient for an operator. Both button switches are spring urged into their normal position and must be depressed by an operator to actuate the respective switch and to keep it actuated.

In the drawings, the reference characters NO and NC refer to the normal position of the various limit switches and push button switches. NO means the switch is normally open and must be actuated to close its contacts. NC means the switch contacts are normally closed and must be actuated into the open position.

Operation

When it is desired to move the runner away from a sheet of glass, the stop button switch 136 is depressed to disconnect the motor starter coil 158 from the potential source 130. Bypass valve 28 is closed and valve 26 is opened to supply fluid from the pressure tank 20 through the fluid supply pipe 24 into the upper chamber of the piston cylinder 22. Such pressure increase forces piston 30 to move down. Lever arms 34 and 54 are rotated clockwise about pivot bearing 52 in the view seen in Figure 1, causing the hooked ends 56 to raise the trunnions 58, thereby raising the polishers from contact with the glass.

When a polisher trunk is removed from the line by a crane lifting trunnions 58, flange 172 becomes disengaged from rollers 170 to limit switch LS1, thus opening the circuit through the motor starting coil 158. The switch contact elements 82 and 84 are immediately thereafter (substantially simultaneously) disconnected, thus disconnecting the motor 64 from its power source.

When a polishing apparatus is replaced in the line, a crane carries the polisher apparatus by means of the trunnions 58 until the trunnions 58 are lowered onto the hooked ends 56 of the lever arms 54, at which time switch contact members 82 and 84 make contact. As the polisher apparatus is lowered, flange 172 contacts rollers 170 of limit switch LS1, thereby closing the latter. Stop button switches 136 are normally urged into a closed position by a spring so that the circuit through these two elements is closed as far as branches 142 and 144. However, since the high resistance 148 is in series with the normally open coil contact 146, and start button switch 150 in branch 144 is normally open, there is no potential across the motor starting coil 158 to cause the starter to operate. It is necessary for the operator to depress start button switch 150 in order to energize starter coil 158 and start rotating shaft 62. Since limit switch LS2 and coil contact 147 are normally closed, pushing the normally open starter button switch 150 completes the circuit to starter coil 158 via branch 144. Once the coil 158 is energized, normally closed contact 147 is opened and normally open contact 146 is closed, thus causing a current flow through branch 142 in series with coil 158. The presence of high resistance 148 in branch 142 limits the potential imposed across coil 158, thereby preventing the latter from burning out.

Limit switch LS2 operates as a safety factor in the event the operator fails to push the start button switch 150 until after the lowering runners move into contact with the glass. This safety feature operates because limit switch LS2 is caused to open whenever the polisher runners 80 contact the glass sheet as described above. With LS2 open, the voltage for the starter coil 158 is largely dissipated through resistance 148 if contact 146 is closed. If contact 146 and LS2 are both open, no current is supplied to the motor starter coil 158.

When it is desired to commence operation, the bypass valve 28 is vented, thus enabling the total weight of the polisher trunk together with the polisher runner and the spider to raise the piston 30 within the piston cylinder 22. The lever arm 34 is then rotated counterclockwise to lower the gear housing 66, and the spider 76 and the felt faced runners toward engagement with the glass. The switch contact elements 82 and 84 were brought into contact when trunnions 58 engaged hook ends 56. When the runner is still out of engagement with the glass, LS2 assumes its normally closed position. Contacts 146 and 147 are in their normally open and closed position, respectively. Thus, when starter button switch 150 is closed, branch 142 is bypassed, and current from source 130 flows through branch 144 to energize starter coil 158 through branch 144. If, at the time start button switch 150 is depressed, LS1 is closed and switch contact elements 82 and 84 are in contact, the starting coil 158 actuates the drive motor 64 to rotate shaft 62.

The location of the collar 42 and the stop nut 48 on the threaded portion of the piston rod 32 may be adjusted so that the polishers apply the proper pressures on the glass, and the runner position compensated for polisher wear.

For the particular apparatus described, the bypass valve must be closed and the reservoir maintained at 80 pounds pressure under conditions of operation to maintain proper pressure for moving the runners from the glass rapidly when adjustments are needed. However, this pressure requirement may be modified for different sizes of apparatus.

The above description of a particular embodiment of the present invention is for purposes of illustration rather than limitation. For example the details of a switch were described for a polisher for finishing the upper surface only of the glass. However, structure incorporating this invention may be used in combination with polishers for finishing the under surface as well as the upper surface of the glass on twin polishing lines.

What is claimed is:

1. In apparatus for polishing plate glass comprising a fixed support structure, means for moving flat glass along a horizontal plane relative to said support structure, and vertically adjustable polisher apparatus carried by said support structure, said polisher apparatus comprising a runner having a surface adapted to polish plate glass by rubbing against a surface thereof, a runner shaft rotatable about a vertical axis to cause the runner to move horizontally relative to the glass, and a drive motor for rotating said runner shaft, the improvement comprising a switch having a first switch contact element in electrical connection with said drive motor and carried by a support movable in unison with said runner and second switch contact element coupled electrically to a source of power and carried by a support attached to the fixed support structure, said switch contact elements being aligned vertically relative to each other, at least one of said supports for the aligned switch contact elements being resilient, whereby the aligned switch contact elements are urged into contact to close an electrical circuit actuating the drive motor before the runner is brought into rubbing contact with the glass.

2. The improvement according to claim 1, wherein the second switch contact element is mounted below the first switch contact element and is urged upwardly by the resilient support toward the first switch contact element.

3. The improvement according to claim 1, wherein each switch contact element comprises electrodes insulated from each other and located to make substantially simultaneous contact with the corresponding insulated electrode of the other switch contact element.

4. The improvement according to claim 1, wherein the drive motor comprises a starter coil, and a limit switch responsive to vertical movement of the polisher apparatus is included in a control circuit for the starter coil, said limit switch being adjusted to remain in the open position until said switch contact elements have been brought into contact upon movement of the polisher apparatus toward the glass and to move into the open position before contact between the switch contact elements is ended upon movement of the polisher apparatus away from the glass surface.

5. The improvement according to claim 4 including an additional limit switch that is normally closed in the control circuit for the starter coil, said additional limit switch being adjusted to open in response to engagement of the polisher runner with the glass surface, thereby disconnecting the starter coil through said additional limit switch.

6. Apparatus for polishing plate glass comprising a fixed support structure, means for moving flat glass along a horizontal plane relative to said support structure, and vertically adjustable polisher apparatus carried by said support structure, said polisher apparatus comprising a runner having a surface adapted to polish plate glass by rubbing against a surface thereof, a runner shaft rotatable about a vertical axis to cause the runner to move horizontally relative to the glass, and a drive motor for rotating said runner shaft, a switch having a first switch contact element and a second switch contact element, the first switch contact element in electrical connection with said drive motor and carried by a support movable in unison with said runner and the second switch contact element connected electrically to a source of power and carried by a support attached to the fixed support structure, said first switch contact element comprising a plurality of cylindrically shaped electrodes mounted in axial alignment along its support and insulated from each other, said second switch contact element comprising a plurality of spaced electrodes having arcuate shaped contact surfaces, each electrode of the second switch contact element being aligned with an electrode of the first switch contact element, and a spring urging each of said spaced electrodes of the second switch contact element toward the aligned electrode of the first switch contact element, whereby upon relative motion of the switch contact elements toward each other, each arcuate shaped contact surface is urged to contact its corresponding cylindrically shaped electrode.

7. A switch having a first switch contact element and a second switch contact element, said first switch contact element comprising a support and a plurality of cylindrically shaped electrodes mounted in axial alignment along said support and insulated from each other, said second switch contact element comprising a support, a plurality of spaced electrodes having arcuate shaped contact surfaces, each electrode of the second switch contact element being aligned with an electrode of the first switch contact element, and a spring urging each of said spaced electrodes toward the aligned electrode of the first switch contact element, whereby upon relative motion of the switch contact elements toward each other, each arcuate shaped contact surface is urged to contact its corresponding cylindrically shaped electrode.

8. Apparatus for polishing plate glass comprising a fixed support structure, means for moving flat glass along a horizontal plane relative to said support structure, vertically adjustable polisher apparatus carried by said support structure, a runner carried by said polisher apparatus and having a surface adapted to polish plate glass by rubbing against a surface thereof, a runner shaft attached to said runner and carried by said polisher apparatus for rotating about a vertical axis to cause the runner to move horizontally relative to the glass surface, a drive motor for rotating said runner shaft, a starter coil for the drive motor, a switch having a first switch contact element in electrical connection with said drive motor and carried by a support movable in unison with said runner and a second switch contact element coupled electrically to a source of power and carried by a support attached to the fixed support structure, said switch contact elements being aligned vertically relative to each other, at least one of said supports for the aligned switch contact elements being resilient, a control circuit for the starter coil, a limit switch in said control circuit fixed to said support structure and normally open, and a flange on said adjustable polisher apparatus located to actuate the limit switch when the polisher runner is within a predetermined distance of the glass surface.

9. Apparatus as in claim 8 which also includes an additional normally closed limit switch in said control circuit and fixed to the support structure, and means responsive to movement of the polisher runner into contact with the glass to actuate said additional limit switch, thereby disconnecting the starter coil from its source of potential through said additional limit switch.

10. Apparatus as in claim 8, including a piston cylinder carried by the fixed housing, a piston rod vertically movable in the piston cylinder, a pivot connection carried by an end of the piston rod, a lever arm pivoted at one end to the pivot connection and pivoted toward its other end to a pivot bearing carried by the fixed support structure and terminating in a bifurcated lever arm having hooked ends, a housing for said runner shaft, trunnions extending from said last named housing and supported by said hooked ends, said normally open limit switch being carried by said lever arm between said pivot bearing and said pivot connection to contact said flange upon upward pivoting of the lever arm on moving the piston rod away from the glass, thereby lowering the support level of the hooked ends supporting said trunnions.

11. Apparatus as in claim 10, including an additional normally closed limit switch in said control circuit and carried by said fixed support structure in vertical alignment with said lever arm and so spaced therefrom to be engageable therewith to open said additional limit switch after said normally open limit switch has been closed upon further movement of the piston rod away from the glass, thereby disconnecting the starter coil from its source of potential through said additional limit switch.

No references cited.